(12) United States Patent
    Noeldner

(10) Patent No.: US 8,660,220 B2
(45) Date of Patent: Feb. 25, 2014

(54) REDUCED FREQUENCY DATA PROCESSING USING A MATCHED FILTER SET FRONT END

(75) Inventor: David Noeldner, Fort Collins, CO (US)

(73) Assignee: LSI Corporation, San Jose, CA (US)

( * ) Notice: Subject to any disclaimer, the term of this patent is extended or adjusted under 35 U.S.C. 154(b) by 1185 days.

(21) Appl. No.: 12/205,819

(22) Filed: Sep. 5, 2008

(65) Prior Publication Data

US 2010/0061492 A1 Mar. 11, 2010

(51) Int. Cl.
*H03D 1/00* (2006.01)
(52) U.S. Cl.
USPC ......................................................... 375/343
(58) Field of Classification Search
USPC .......... 375/148, 343, 341, 371; 370/338, 280; 340/825.72; 326/8; 342/463; 360/39, 360/46; 455/296
See application file for complete search history.

(56) References Cited

U.S. PATENT DOCUMENTS

| | | | |
|---|---|---|---|
| 5,278,846 A | 1/1994 | Okayama et al. | |
| 5,325,402 A | 6/1994 | Ushirokawa | |
| 5,392,299 A | 2/1995 | Rhines et al. | |
| 5,513,192 A | 4/1996 | Janku et al. | |
| 5,515,036 A * | 5/1996 | Waraksa et al. | ............ 340/12.11 |
| 5,612,964 A | 3/1997 | Haraszti | |
| 5,701,314 A | 12/1997 | Armstrong et al. | |
| 5,717,706 A | 2/1998 | Ikeda | |
| 5,844,945 A | 12/1998 | Nam et al. | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | McCallister et al. | |
| 6,023,783 A | 2/2000 | Divsalar et al. | |
| 6,029,264 A | 2/2000 | Kobayashi et al. | |
| 6,041,432 A | 3/2000 | Ikeda | |
| 6,097,764 A | 8/2000 | McCallister et al. | |
| 6,216,251 B1 | 4/2001 | McGinn | |

(Continued)

FOREIGN PATENT DOCUMENTS

| | | |
|---|---|---|
| WO | WO 2006/016751 | 2/2006 |
| WO | WO 2006/091797 | 8/2007 |

OTHER PUBLICATIONS

Collins and Hizlan, "Determinate State Convolutional Codes" IEEE Transactions on Communications, Dec. 1993.

(Continued)

*Primary Examiner* — Sam K Ahn
*Assistant Examiner* — Shawkat M Ali
(74) *Attorney, Agent, or Firm* — Hamilton DeSanctis & Cha

(57) ABSTRACT

Various embodiments of the present invention provide systems and methods for reduced clock rate data processing. As an example, a circuit is disclosed that includes a matched filter bank that receives a series of symbols at a rate corresponding to a sample clock. The matched filter bank includes a first matched filter tuned to detect a first bit sequence in the series of symbols and to assert a first symbol proxy upon detection of the first bit sequence, and a second matched filter tuned to detect a second bit sequence in the series of symbols and to assert a second symbol proxy upon detection of the second bit sequence. The circuit further includes a detector circuit that processes a series of symbol proxies including the first symbol proxy and the second symbol proxy at a rate corresponding to a reduced rate clock. The reduced rate clock is the sample clock divided by a factor.

20 Claims, 10 Drawing Sheets

(56) References Cited

U.S. PATENT DOCUMENTS

| | | | |
|---|---|---|---|
| 6,266,795 | B1 | 7/2001 | Wei |
| 6,317,472 | B1 | 11/2001 | Choi et al. |
| 6,351,832 | B1 | 2/2002 | Wei |
| 6,377,610 | B1 | 4/2002 | Hagenauer et al. |
| 6,438,717 | B1 | 8/2002 | Butler et al. |
| 6,473,878 | B1 | 10/2002 | Wei |
| 6,594,217 | B1* | 7/2003 | Reed .................. 369/59.19 |
| 6,625,775 | B1 | 9/2003 | Kim |
| 6,671,404 | B1 | 12/2003 | Kawatani et al. |
| 6,748,034 | B2 | 6/2004 | Hattori et al. |
| 6,757,862 | B1 | 6/2004 | Marianetti, II |
| 6,788,654 | B1 | 9/2004 | Hashimoto et al. |
| 6,810,502 | B2 | 10/2004 | Eidson et al. |
| 6,986,098 | B2 | 1/2006 | Poeppelman et al. |
| 7,010,051 | B2 | 3/2006 | Murayama et al. |
| 7,047,474 | B2 | 5/2006 | Rhee et al. |
| 7,058,873 | B2 | 6/2006 | Song et al. |
| 7,093,179 | B2 | 8/2006 | Shea |
| 7,184,486 | B1 | 2/2007 | Wu et al. |
| 7,191,378 | B2 | 3/2007 | Eroz et al. |
| 7,203,887 | B2 | 4/2007 | Eroz et al. |
| 7,257,764 | B2 | 8/2007 | Suzuki et al. |
| 7,310,768 | B2 | 12/2007 | Eidson et al. |
| 2003/0095350 | A1* | 5/2003 | Annampedu et al. ............ 360/39 |
| 2003/0099313 | A1* | 5/2003 | Li et al. .................. 375/343 |
| 2004/0098659 | A1 | 5/2004 | Bjerke et al. |
| 2004/0190603 | A1* | 9/2004 | Dabak et al. .................. 375/148 |
| 2005/0216819 | A1 | 9/2005 | Chugg et al. |
| 2005/0273688 | A1 | 12/2005 | Argon |
| 2006/0020872 | A1 | 1/2006 | Richardson et al. |
| 2006/0031737 | A1 | 2/2006 | Chugg et al. |
| 2006/0140311 | A1 | 6/2006 | Ashley et al. |
| 2006/0168493 | A1 | 7/2006 | Song |
| 2006/0195772 | A1 | 8/2006 | Graef et al. |
| 2006/0248435 | A1 | 11/2006 | Haratsch |
| 2007/0047635 | A1 | 3/2007 | Stojanovic et al. |
| 2007/0286264 | A1* | 12/2007 | Kontola et al. ............... 375/152 |
| 2007/0286270 | A1 | 12/2007 | Huang et al. |
| 2008/0049825 | A1 | 2/2008 | Chen et al. |
| 2008/0130604 | A1* | 6/2008 | Boyd ............................ 370/338 |
| 2008/0168330 | A1 | 7/2008 | Graef et al. |
| 2009/0028279 | A1* | 1/2009 | Kitta .............................. 375/371 |

OTHER PUBLICATIONS

Eleftheriou, E. et al., "Low Density Parity Check Codes for Digital Subscriber Lines", Proc ICC 2002, pp. 1752-1757.

Han and Ryan, "Pinning Techniques for Low-Floor Detection/Decoding of LDPC-Coded Partial Response Channels", 5th International Symposium on Turbo Codes &Related Topics, 2008.

Mohsenin et al., "Split Row: A Reduced Complexity, High Throughput LDPC Decoder Architecture", pp. 1-6, printed from www.ece.ucdavis.edu on Jul. 9, 2007.

Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Yeo et al., "VLSI Architecture for Iterative Decoders in Magnetic Storage Channels", Mar. 2001, pp. 748-755, IEEE trans. Magnetics, vol. 37, No. 2.

Zhong et al., "Area-Efficient Min-Sum Decoder VLSI Architecture for High-Rate QC-LDPC Codes in Magnetic Recording", pp. 1-15, Submitted 2006, not yet published.

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC Techron, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

* cited by examiner

REDUCED FREQUENCY DATA PROCESSING USING A MATCHED FILTER SET FRONT END

BACKGROUND OF THE INVENTION

The present invention is related to systems and methods for processing information, and more particularly to systems and methods for processing a series of encoded bits.

Data transfer systems typically include a receiver that converts an analog input into a stream of digital bits representing the analog input. For example, in a hard disk drive system, digital information is converted to an analog signal that is stored as a magnetic signal on a storage medium. The magnetic information is sensed and converted to an analog signal. The received analog signal is converted back to digital information representing the digital information originally provided to the storage medium. As another example, a wireless communication system involves a transmitter that receives digital information, and converts it to an analog signal that is transmitted. The analog signal is received and converted back to the original digital information that was originally prepared for transmission.

Turning to FIG. 1, a prior art system 100 for converting a received analog signal into corresponding digital information is depicted. System 100 includes an analog to digital converter that converts an analog input 105 into a series of digital sample values that are provided to a filter 120 that is synchronized to a sample clock 125. Filter 125 provides a real output 130 that is provided to a Viterbi decoder 140. Viterbi decoder 140 is synchronized to sample clock 125, and performs a detection process that yields an ideal output 145. Ideal output 145 and real output 130 are both provided to a comparator 150 that yields an error value 155. Error value 155 is provided to a clock adjustment circuit 160. Clock adjustment circuit 160 receives a reference clock 165 and is operable to provide sample clock 125. Thus, sample clock 125 is adjusted based upon a combination of real output 130 and ideal output 145.

There is a desire to increase the bandwidth of data decoding systems such as system 100. One approach is to increase the rate of sample clock 125 which allows for receiving and converting a higher bandwidth analog input 105. Such an approach results in considerable power consumption by Viterbi decoder 140. Further, depending upon the available technology, Viterbi decoder 140 cannot be designed to accommodate a large increase in sample clock 125. In some cases, Viterbi decoder 140 is designed as a group of parallel decoders with cross-linked information. Such an approach increases the size of the Viterbi trellis by parallelizing the algorithm and looking deeper into the trellis on each clock cycle. While this allows an effective reduction in the clock rate for the same throughput, it comes at, among other things, a substantial increase in the amount of logic required to implement Viterbi decoder 140.

Hence, for at least the aforementioned reasons, there exists a need in the art for advanced systems and methods for processing a received signal.

BRIEF SUMMARY OF THE INVENTION

The present invention is related to systems and methods for processing information, and more particularly to systems and methods for processing a series of encoded bits.

Various embodiments of the present invention provide reduced clock rate data decoding circuits. Such circuits include a matched filter bank that receives a series of symbols at a rate corresponding to a sample clock. The matched filter bank includes a first matched filter tuned to detect a first bit sequence in the series of symbols and to assert a first symbol proxy upon detection of the first bit sequence, and a second matched filter tuned to detect a second bit sequence in the series of symbols and to assert a second symbol proxy upon detection of the second bit sequence. The circuits further include a detector circuit that processes a series of symbol proxies including the first symbol proxy and the second symbol proxy at a rate corresponding to a reduced rate clock. The reduced rate clock is the sample clock divided by a factor. In some instances of the aforementioned embodiments, the first matched filter and the second matched filter are finite impulse response filters. In some instances of the aforementioned embodiments, the detector circuit is a Viterbi algorithm detector.

In one particular instance of the aforementioned embodiments, the matched filter bank further includes a third matched filter tuned to detect a third bit sequence in the series of symbols and to assert a third symbol proxy upon detection of the third bit sequence, and a fourth matched filter tuned to detect a fourth bit sequence in the series of symbols and to assert a fourth symbol proxy upon detection of the fourth bit sequence. In such an instance, the series of symbol proxies further includes the third symbol proxy and the fourth symbol proxy. In one particular case, the first bit sequence is '00', the second bit sequence is '01', the third bit sequence is '10' and the fourth bit sequence is '11'; and the factor is two.

In another particular instance of the aforementioned embodiments, the matched filter bank further includes a third matched filter tuned to detect a third bit sequence in the series of symbols and to assert a third symbol proxy upon detection of the third bit sequence, a fourth matched filter tuned to detect a fourth bit sequence in the series of symbols and to assert a fourth symbol proxy upon detection of the fourth bit sequence, a fifth matched filter tuned to detect a fifth bit sequence in the series of symbols and to assert a fifth symbol proxy upon detection of the fifth bit sequence, a sixth matched filter tuned to detect a sixth bit sequence in the series of symbols and to assert a sixth symbol proxy upon detection of the sixth bit sequence, a seventh matched filter tuned to detect a seventh bit sequence in the series of symbols and to assert a seventh symbol proxy upon detection of the seventh bit sequence, and an eighth matched filter tuned to detect a eighth bit sequence in the series of symbols and to assert an eighth symbol proxy upon detection of the eighth bit sequence. In such an instance, the series of symbol proxies further includes the third symbol proxy, the fourth symbol proxy, the fifth symbol proxy, the sixth symbol proxy, the seventh symbol proxy and the eighth symbol proxy. In one particular case, the first bit sequence is '000', the second bit sequence is '001', the third bit sequence is '010', the fourth bit sequence is '011', the fifth bit sequence is '100', the sixth bit sequence is '101', the seventh bit sequence is '110' and the eighth bit sequence is '111'. In such a case, the factor is three.

In various instances of the aforementioned embodiments, the circuit includes an analog to digital converter that receives an analog input and provides a series of digital samples of the analog input; and a filter that receives the series of digital samples, filters noise associated with the series of digital samples, and provides the series of symbols. In some cases, the noise includes inter symbol interference. In particular instances of the aforementioned embodiments, the symbol proxies include a predicted level along with confidence information indicating a degree of confidence in the predicted level.

Other embodiments of the present invention provide methods for data detection using a reduced rate clock. The methods include receiving a series of symbols at a rate corresponding to an input clock, and filtering the series of symbols in parallel through a first matched filter, a second matched filter, a third matched filter and a fourth matched filter. The first matched filter is tuned to detect a first bit sequence in the series of symbols and to assert a first symbol proxy upon detection of the first bit sequence, the second matched filter is tuned to detect a second bit sequence in the series of symbols and to assert a second symbol proxy upon detection of the second bit sequence, the third matched filter is tuned to detect a third bit sequence in the series of symbols and to assert a third symbol proxy upon detection of the third bit sequence, and the fourth matched filter is tuned to detect a fourth bit sequence in the series of symbols and to assert a fourth symbol proxy upon detection of the fourth bit sequence. A data detection is performed on a series of symbol proxies including the first symbol proxy, the second symbol proxy, the third symbol proxy and the fourth symbol proxy at a rate corresponding to the input clock divided by a factor. In one particular instance of the aforementioned embodiments, the first bit sequence is '00', the second bit sequence is '01', the third bit sequence is '10' and the fourth bit sequence is '11', and the factor is two. In some instances of the aforementioned embodiments, the methods further include receiving an analog signal, performing an analog to digital conversion on the analog signal to generate a series of digital samples representing the analog signal, and filtering the series of digital samples to yield the series of symbols. In such instances, the analog to digital conversion may be done at a rate corresponding to the input clock.

Yet other embodiments of the present invention provide communication systems having a receiver with a reduced rate data detector. Such systems include a receiver including: an analog to digital converter, a matched filter bank, and a detector. The analog to digital converter is operable to receive an analog signal and to generate a series of digital samples representing the analog signal at a rate corresponding to an input clock. The matched filter bank receives a series of symbols derived from the series of digital samples and filters the received series of symbols through a first matched filter tuned to detect a first bit sequence in the series of symbols and to assert a first symbol proxy upon detection of the first bit sequence, a second matched filter tuned to detect a second bit sequence in the series of symbols and to assert a second symbol proxy upon detection of the second bit sequence, a third matched filter tuned to detect a third bit sequence in the series of symbols and to assert a third symbol proxy upon detection of the third bit sequence, and a fourth matched filter tuned to detect a fourth bit sequence in the series of symbols and to assert a fourth symbol proxy upon detection of the fourth bit sequence. The detector processes a series of symbol proxies including the first symbol proxy, the second symbol proxy, the third symbol proxy and the fourth symbol proxy at a rate corresponding to the input clock divided by a factor. In some cases, the factor is an integer value larger than one.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for processing information, and more particularly to systems and methods for processing a series of encoded bits.

Some embodiments of the present invention provide a bank of auto-convolution filters (i.e., matched filters) that feed a detector. The bank of auto-convolution filters make decisions based on short patterns within a sequence of bits, with identification of the short patterns being passed on to the detector for additional processing. Since only relatively short patterns are detected using the bank of auto-convolution filters, the number of auto-convolution filters included in the bank of auto-convolution filters remains reasonable. The value of the detector is still realized as it still calculates the difference metric on a longer sequence of bits, but its operation can be achieved at a reduced processing frequency by modifying the algorithm to operate on symbol proxies (i.e., patterns of two or more symbols). Further, in some cases, the bank of auto-convolution filters may provide pattern dependent noise prediction and may be designed to additionally de-correlate noise for specific data patterns in addition to performing detection of finite length patterns. The bank of auto-convolution filters may also be designed to provide the most likely sequences (one or more most likely sequences) to the receiving detector, and the detector may be designed to use this information to track the best overall sequence through an implemented detection trellis. Such an approach reduces the design complexity of an implemented detector as the detector is able to operate at a reduced frequency when compared with the sampling frequency of a received analog input.

Figure 2:
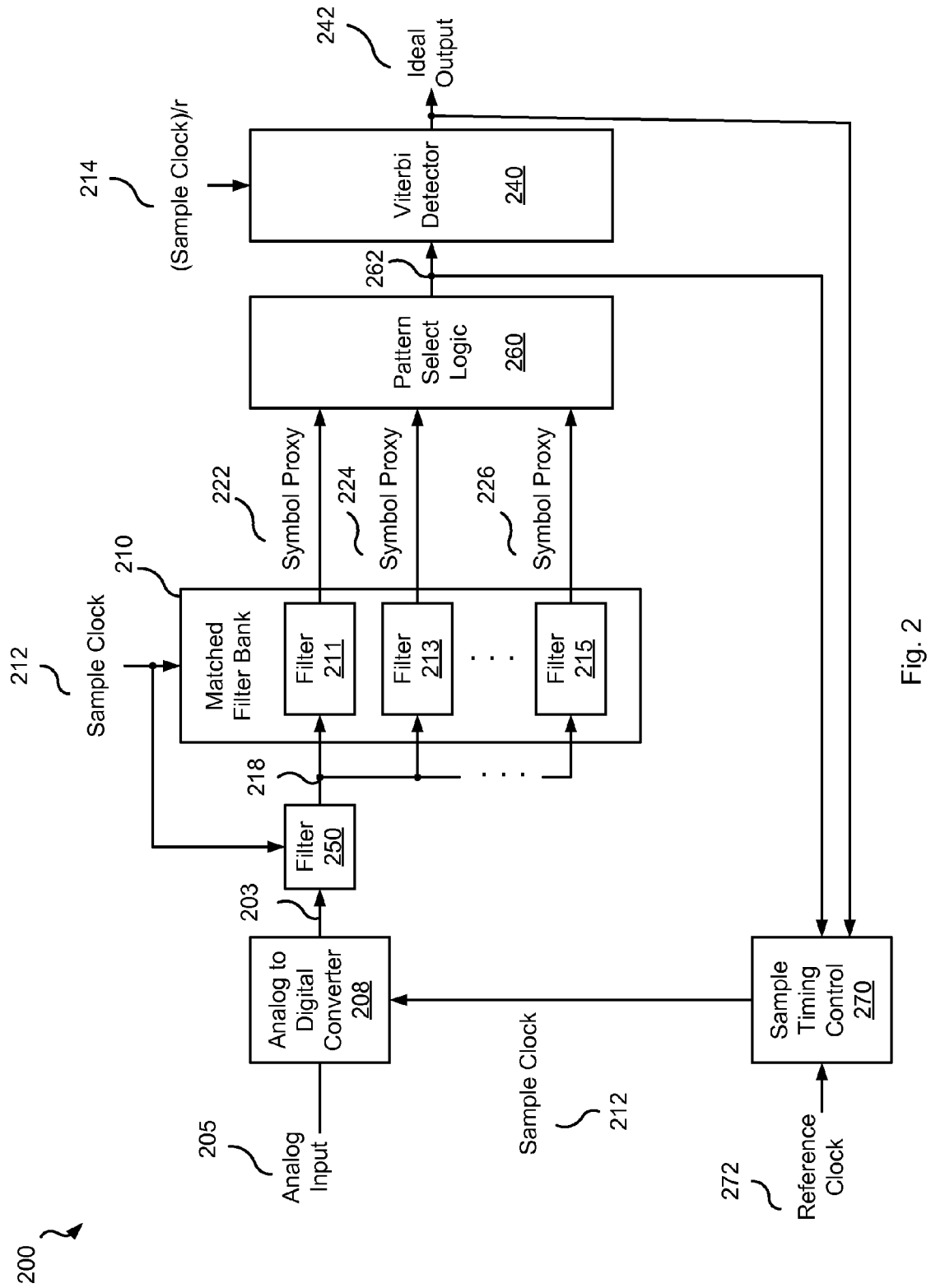
FIG. 2 depicts a decoding system in accordance with some embodiments of the present invention for reducing the effective clock rate of a detector through use of a preceding matched filter set.

Turning to FIG. 2, a decoding system 200 is depicted in accordance with some embodiments of the present invention. Decoding system 200 includes a matched filter bank 210 that operates to reduce an incoming set of symbols 218 to symbol proxies 222, 224, 226, and is synchronized to a sample clock 212. Symbol proxies 222, 224, 226 are processed by a Viterbi detector 240 synchronous to a frequency reduced clock 214 (i.e., sample clock 212 divided by a factor 'r'). In particular, decoding system 200 includes an analog to digital converter 208 that converts an analog input 205 into a series of digital samples 203 synchronized to sample clock 212. Respective digital samples 203 are provided on each cycle of sample clock 212 to a filter 250. Filter 250 may be a finite impulse response filter tailored for reducing any noise incorporated into analog input 208.

Filter 250 provides a filtered digital output 218 to matched filter bank 210 that includes a number of filters 211, 213, 215 each tailored to detecting a different pattern (i.e., defined sequence) of digital bits. In one particular embodiment of the present invention, filters 211, 213, 215 are implemented as finite impulse response filters tuned to particular bit patterns. For example, filter 211 may be tailored for detecting a '00' series, filter 213 may be tailored for detecting a '01' series, and filter 215 may be tailored for detecting a '11' series. Based on the disclosure provided herein, one of ordinary skill in the art will recognize a variety of patterns that may be recognized by a given filter implementation. Further, a given filter may be designed to detect a pattern of two or more digital bits. Anytime the particular pattern to which a filter is tuned is identified, a respective symbol proxy 222, 224, 226 associated with the particular filter is asserted. Thus, following the above example where filter 211 is tuned for detecting a '00' series, filter 213 is tuned for detecting a '01' series, and filter 215 is tuned for detecting a '11' series, symbol proxy 222 is asserted whenever a '00' pattern is identified, symbol proxy 224 is asserted whenever a '01' pattern is identified, and symbol proxy 226 is asserted whenever a '11' pattern is identified.

A pattern select logic circuit 260 selects which of symbol proxies 222, 224, 226 is passed as a real output 262 to Viterbi detector 240. In some cases, in addition to passing symbol proxies 222, 224, 226 to Viterbi detector 240, a confidence metric (i.e., soft information) is provided to Viterbi detector 240 instead of a single bit value. In some cases, there is no feedback in the matched filters which reduces the possibility of error propagation. After processing, Viterbi detector 240 yields an ideal output 242. Where each of symbol proxies 222, 224, 226 represent a sequence of two defined bits, then Viterbi detector 240 operates at one half the rate of matched filter bank 210. Said another way, frequency reduced clock 214 is one half the frequency of sample clock 212. Reduction to a half rate frequency uses a matched filter bank with four tuned filters—one for '00', another for '01', another for '10', and yet another for '11'. Alternatively, where each of symbol proxies 222, 224, 226 represent a series of three defined bits, then Viterbi detector 240 operates an one third the rate of matched filter bank 210. Said another way, frequency reduced clock 214 is one third the frequency of sample clock 212.

Reduction to a third rate frequency uses a matched filter bank with eight tuned filters—one for '000', another for '001', another for '010', another for '011', another for '100', another for '101', another for '110', and yet another for '111'. It should be noted that the filters may be tuned to detect even longer patterns in which case more filters would be used, with a corresponding decrease in frequency reduced clock 214. Based on the disclosure provided herein, one of ordinary skill in the art will recognize a variety of combinations of matched filter banks and frequency reduced clocks 214 that are possible in accordance with different embodiments of the present invention. Of note, by reducing the frequency at which Viterbi detector 240 operates without reducing the frequency at which analog input 205 is received and processed, a higher bandwidth decoding system is possible using a less complex Viterbi detector 240.

Similar to existing decoding systems, real output 262 and ideal output 242 are provided to a sample timing control circuit 270 that is responsible for generating sample clock 212 based on a reference clock 272. In particular, the phase and frequency of sample clock 212 are adjusted based on a comparison of real output 262 and ideal output 242.

Figure 3A:
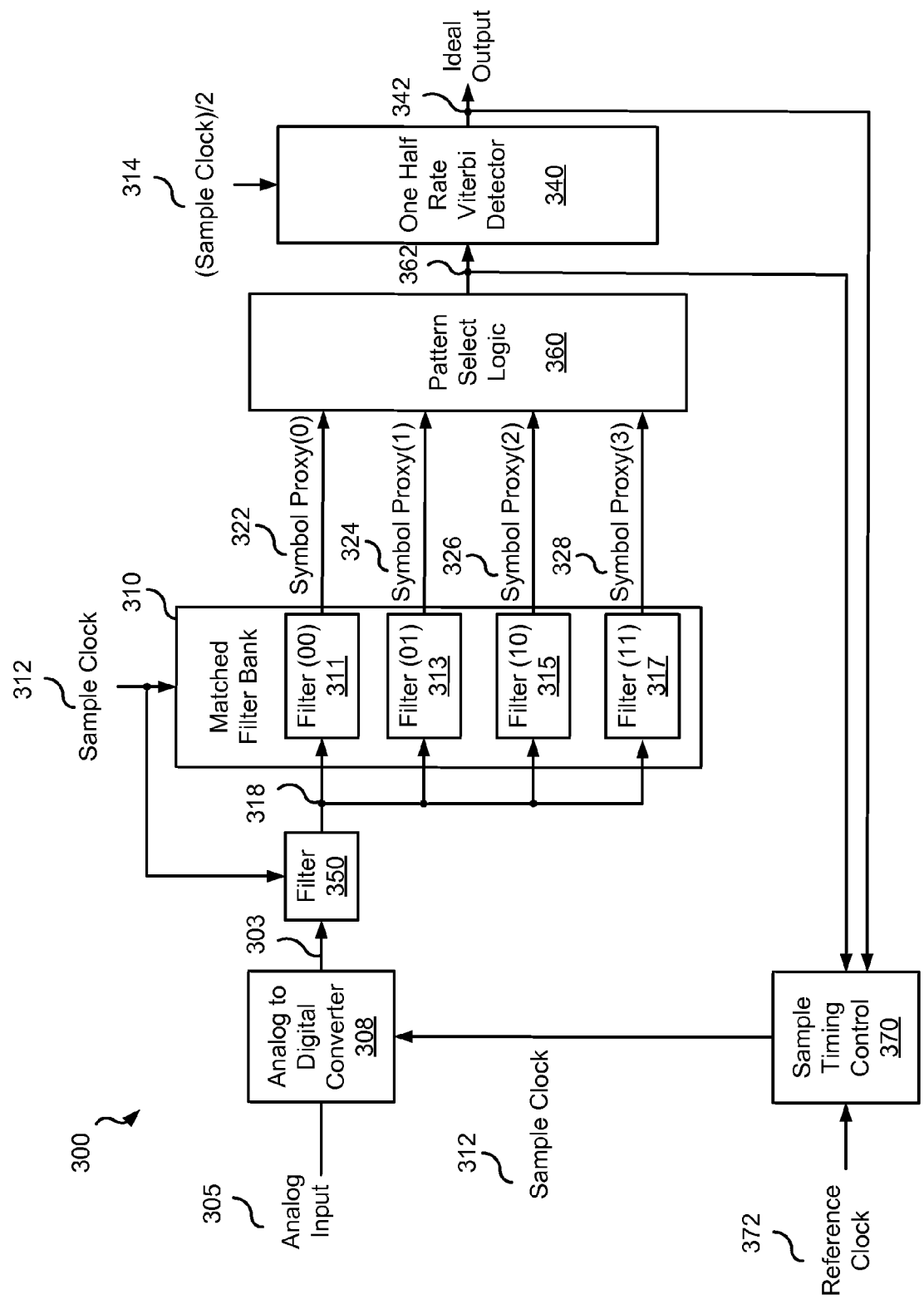
FIG. 3a shows a more particular implementation of the decoding system of FIG. 2 where the effective clock rate of the detector is reduced by a factor of two in accordance with one or more embodiments of the present invention.

Turning to FIG. 3a, a decoding system 300 is depicted that is a more particular implementation of decoding system 200 where the effective clock rate of Viterbi detector 240 is reduced by a factor of two in accordance with one or more embodiments of the present invention. Decoding system 300 includes a matched filter bank 310 that operates to reduce an incoming set of symbols 318 to symbol proxies 322, 324, 326, 328 and is synchronized to a sample clock 312. Symbol proxies 322, 324, 326, 328 are processed by a Viterbi detector 340 synchronous to a half rate clock 314 (i.e., sample clock 312 divided by two). In particular, decoding system 300 includes an analog to digital converter 308 that converts an analog input 305 into a series of digital samples 303 synchronized to sample clock 312. Respective digital samples 303 are provided on each cycle of sample clock 312 to a filter 350. Filter 350 may be a finite impulse response filter tailored for reducing any noise incorporated into analog input 308.

Filter 350 provides a filtered digital output 318 to matched filter bank 310 that includes a number of filters 311, 313, 315, 317 that are each tailored or tuned to detect a different two bit sequence. In one particular embodiment of the present invention, filters 311, 313, 315, 317 are implemented as finite impulse response filters each tuned to respective two bit sequences. Filter 311 is tuned to detect a '00' sequence, filter 313 is tuned to detect a '01' sequence, filter 315 is tuned to detect a '10' sequence, and filter 317 is tuned to detect a '11' series. Anytime the particular pattern to which a filter is tuned is identified, a respective symbol proxy 322, 324, 326, 328 associated with the particular filter is asserted. Thus, where a '00' sequence is detected symbol proxy 322 is asserted, where a '01' sequence is detected symbol proxy 324 is asserted, where a '10' sequence is detected symbol proxy 326 is asserted, and where a '11' sequence is detected symbol proxy 328 is asserted.

A pattern select logic circuit 360 selects which of symbol proxies 322, 324, 326, 328 is passed as a real output 362 to Viterbi detector 340. In addition, pattern select logic circuit 360 may provide soft information in relation to the selected proxy. After processing, Viterbi detector 340 yields an ideal output 342. As each of symbol proxies 322, 324, 326, 328 represent a defined series of bits, Viterbi detector 340 operates to perform a detection algorithm at one half the rate of matched filter bank 310. Said another way, half rate clock 314 is one half the frequency of sample clock 312. Again, by reducing the frequency at which Viterbi detector 340 operates without reducing the frequency at which analog input 305 is received and processed, a higher bandwidth decoding system is possible using a less complex Viterbi detector 340. Similar to existing decoding systems, real output 362 and ideal output 342 are provided to a sampling control circuit 342 that is responsible for generating sample clock 312 based on a reference clock 312. In particular, the phase and frequency of sample clock 312 are adjusted based on a comparison of real output 362 and ideal output 342.

Figure 3B:
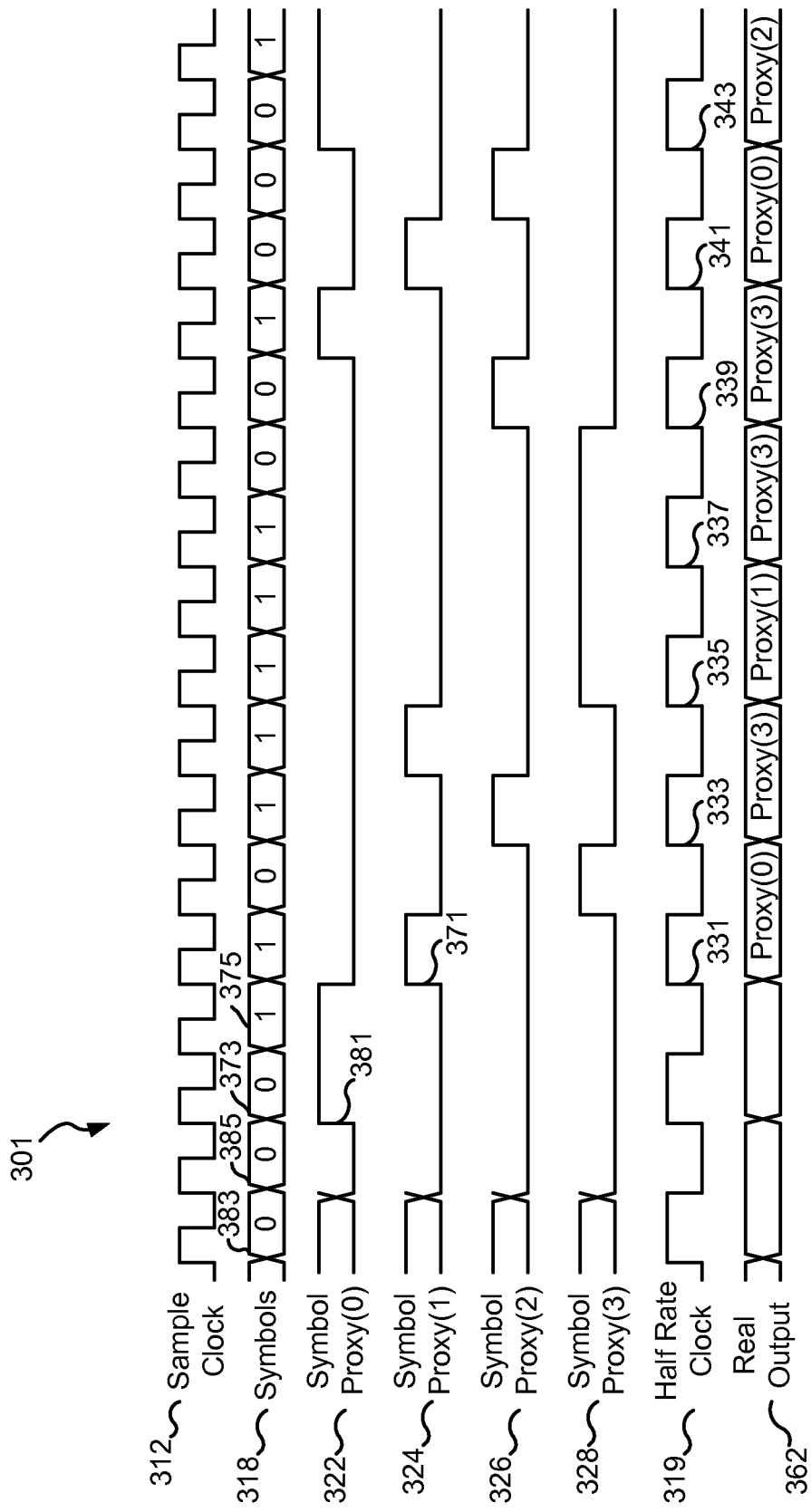
FIG. 3b is a timing diagram depicting an exemplary operation of the decoding system of FIG. 3 where the detector is synchronized to a half rate clock.

Turning to FIG. 3b, a timing diagram 301 depicts an exemplary operation of decoding system 300 with Viterbi detector 340 operating at one half rate. As shown, an arbitrary pattern of one bit symbols 318 is received from filter 350 synchronous to sample clock 312. Whenever a series of two bits matching the sequence to which a filter is tuned is received, a symbol proxy associated with that filter is asserted. As an example, at a point 381 symbol proxy 322 is asserted synchronous to sample clock 312 based on a bit 383 and a bit 385. As another example, at a point 371 symbol proxy 324 is asserted synchronous to sample clock 312 based on a bit 373 and a bit 375. This process of asserting and de-asserting symbol proxies 322, 324, 326, 328 is performed on each cycle of sample clock 312 and is based on the immediately preceding two bits of symbols 318.

Half rate clock 314 is used to sample which of symbol proxies 322, 324, 326, 328 is asserted and to provide the detected assertion as real output 362. Thus, in this case, at a time 331, symbol proxy 322 is asserted and real output 362 is identified with Proxy(0) in place of the aforementioned symbol pattern; at a time 333, symbol proxy 328 is asserted and real output 362 is identified with Proxy(3) in place of the aforementioned symbol pattern; at a time 335, symbol proxy 324 is asserted and real output 362 is identified with Proxy(1) in place of the aforementioned symbol pattern; at a time 337, symbol proxy 328 is asserted and real output 362 is identified with Proxy(3) in place of the aforementioned symbol pattern; at a time 339, symbol proxy 328 is asserted and real output 362 is identified with Proxy(3) in place of the aforementioned symbol pattern; at a time 341, symbol proxy 322 is asserted and real output 362 is identified with Proxy(0) in place of the aforementioned symbol pattern; and at a time 343, symbol proxy 326 is asserted and real output 362 is identified with Proxy(2) in place of the aforementioned symbol pattern. This half rate series of symbol proxies may then be processed by Viterbi detector 340 using half rate clock 314.

Figure 4A:
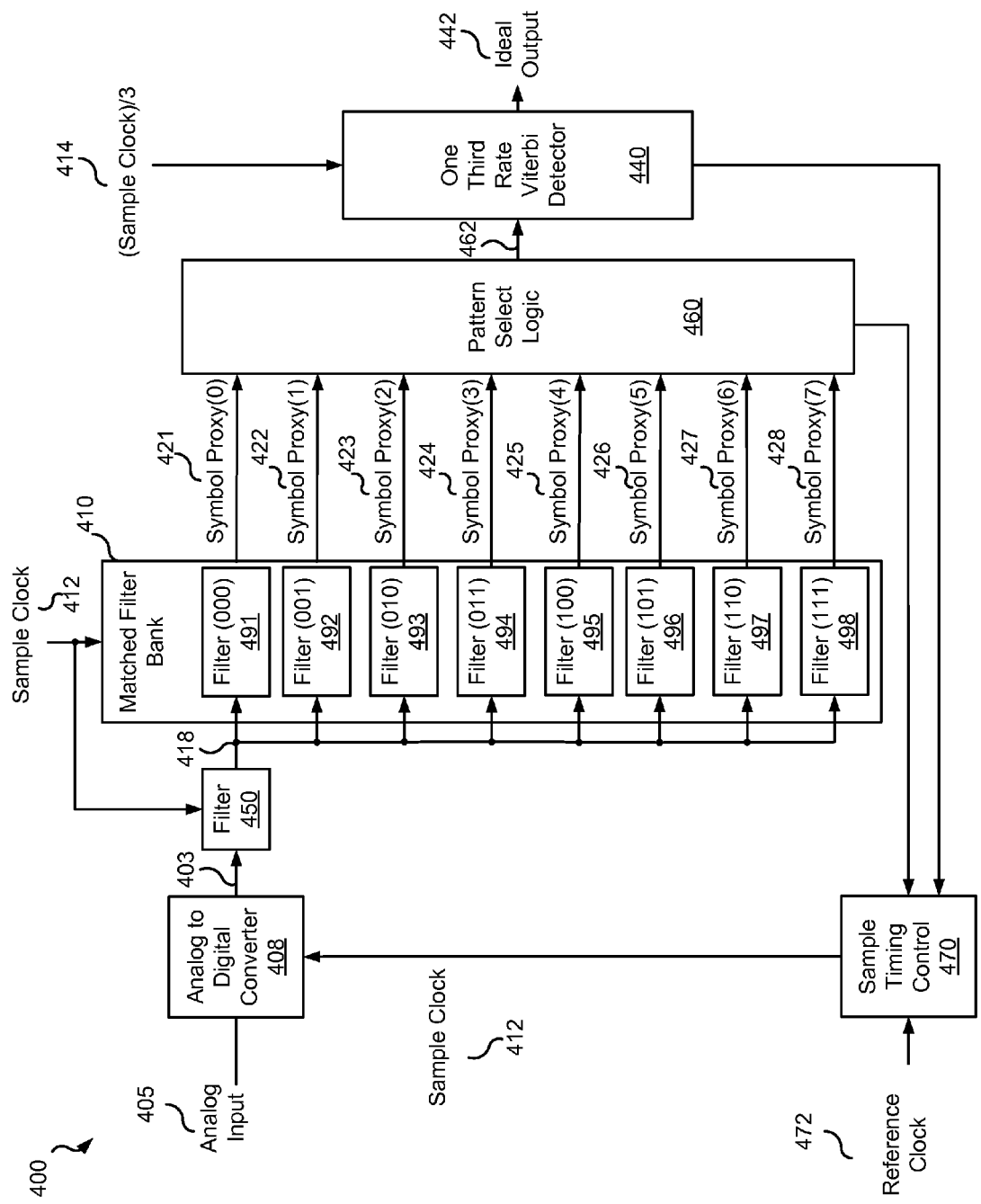
FIG. 4a shows a more particular implementation of the decoding system of FIG. 2 where the effective clock rate of the detector is reduced by a factor of three in accordance with one or more embodiments of the present invention.

Turning to FIG. 4a, a decoding system 400 is depicted that is a more particular implementation of decoding system 200 where the effective clock rate of Viterbi detector 240 is reduced by a factor of three in accordance with one or more embodiments of the present invention. Decoding system 400 includes a matched filter bank 410 that operates to reduce an incoming set of symbols 418 to symbol proxies 421, 422, 423, 424, 425, 426, 427, 428 and is synchronized to a sample clock 412. Symbol proxies 421, 422, 423, 424, 425, 426, 427, 428 are processed by a Viterbi detector 440 synchronous to a third rate clock 414 (i.e., sample clock 412 divided by three). In particular, decoding system 400 includes an analog to digital converter 408 that converts an analog input 405 into a series of digital samples 403 synchronized to sample clock 412. Respective digital samples 403 are provided on each cycle of sample clock 412 to a filter 450. Filter 450 may be a finite impulse response filter tailored for reducing any noise incorporated into analog input 408.

Filter 450 provides a filtered digital output 418 to matched filter bank 410 that includes a number of filters 491, 492, 493, 494, 495, 496, 497, 498 that are each tailored to detecting a different three bit sequence. In one particular embodiment of the present invention, filters 491, 492, 493, 494, 495, 496, 497, 498 are implemented as finite impulse response filters each tuned to respective three bit sequences. Filter 491 is tuned to detect a '000' sequence, filter 492 is tuned to detect a '001' sequence, filter 493 is tuned to detect a '010' sequence, filter 494 is tuned to detect a '011' sequence, filter 495 is tuned to detect a '100' sequence, filter 496 is tuned to detect a '101' sequence, filter 497 is tuned to detect a '110' sequence, and filter 498 is tuned to detect a '111' sequence. Anytime the particular pattern to which a filter is tuned is identified, a respective symbol proxy 421, 422, 423, 424, 425, 426, 427, 428 associated with the particular filter is asserted. Thus, where a '000' sequence is detected symbol proxy 421 is asserted, where a '001' sequence is detected symbol proxy 422 is asserted, where a '010' sequence is detected symbol proxy 423 is asserted, where a '011' sequence is detected symbol proxy 424 is asserted, where a '100' sequence is detected symbol proxy 425 is asserted, where a '101' sequence is detected symbol proxy 426 is asserted, where a '110' sequence is detected symbol proxy 427 is asserted, and where a '111' sequence is detected symbol proxy 428 is asserted.

A pattern select logic circuit 460 selects which of symbol proxies 421, 422, 423, 424, 425, 426, 427, 428 is passed as a real output 462 to Viterbi detector 440. After processing, Viterbi detector 440 yields an ideal output 442. As each of symbol proxies 421, 422, 423, 424, 425, 426, 427, 428 represent a defined series of bits, Viterbi detector 440 operates to perform a detection algorithm at one third the rate of matched filter bank 410. Said another way, third rate clock 414 is one third the frequency of sample clock 412. Again, by reducing the frequency at which Viterbi detector 440 operates without reducing the frequency at which analog input 405 is received and processed, a higher bandwidth decoding system is possible using a less complex Viterbi detector 440. Similar to existing decoding systems, real output 462 and ideal output 442 are provided to a sampling control circuit 442 that is responsible for generating sample clock 412 based on a reference clock 412. In particular, the phase and frequency of sample clock 412 are adjusted based on a comparison of real output 462 and ideal output 442.

Figure 4B:
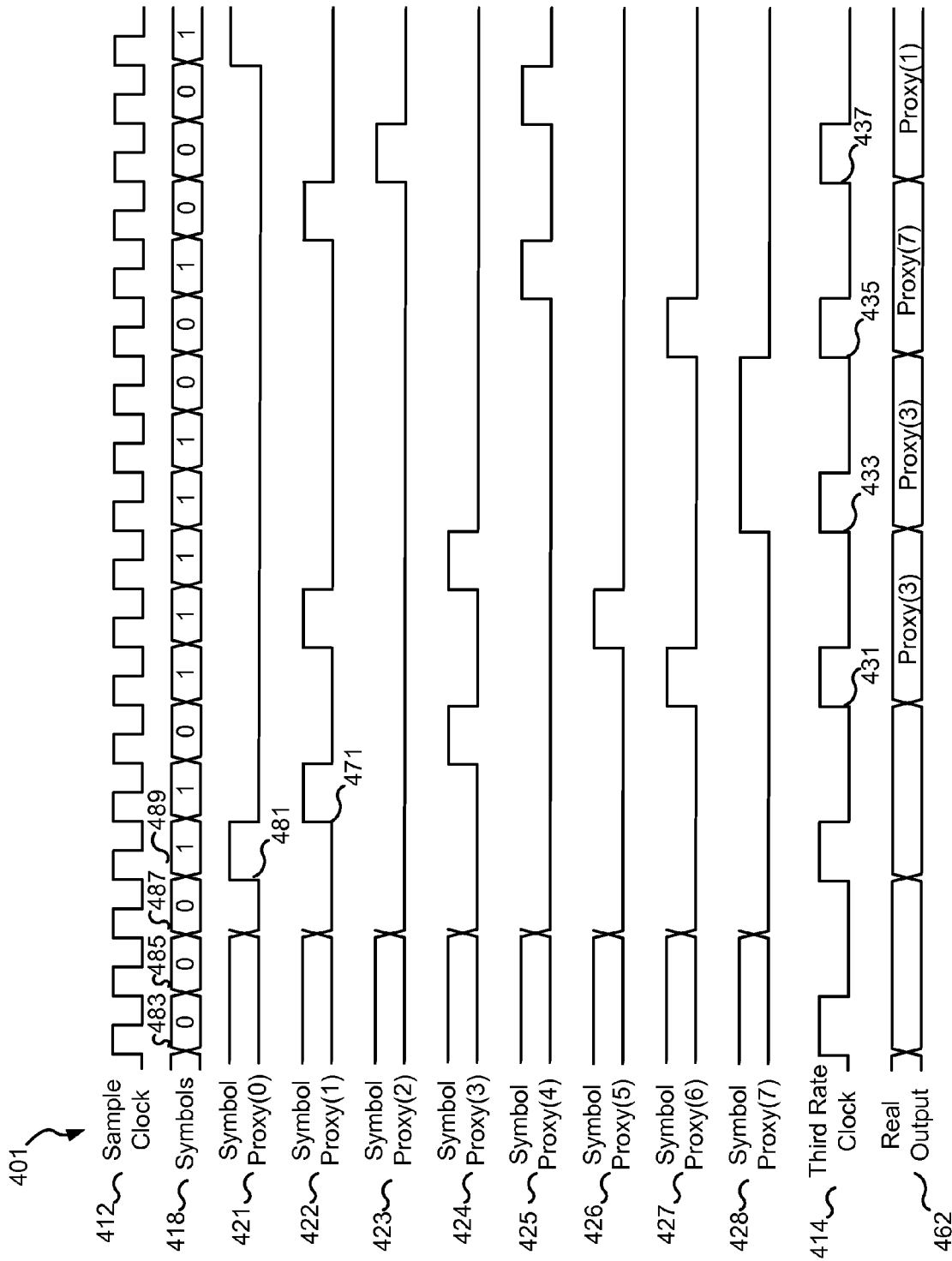
FIG. 4b is a timing diagram depicting an exemplary operation of the decoding system of FIG. 4 where the detector is synchronized to a third rate clock.

Turning to FIG. 4b, a timing diagram 401 depicts an exemplary operation of decoding system 400 with Viterbi detector 440 operating at one third rate. As shown, an arbitrary pattern of one bit symbols 418 is received from filter 450 synchronous to sample clock 412. Whenever a series of three bits matching the sequence to which a filter is tuned is received, a symbol proxy associated with that filter is asserted. As an example, at a point 481 symbol proxy 421 is asserted synchronous to sample clock 412 based on a bit 483, a bit 385 and a bit 487. As another example, at a point 471 symbol proxy 422 is asserted synchronous to sample clock 412 based on bit 485, bit 487, and a bit 489. This process of asserting and de-asserting symbol proxies 421, 422, 423, 424, 425, 426, 427, 428 is performed on each cycle of sample clock 412 and is based on the immediately preceding three bits of symbols 418.

Third rate clock 414 is used to sample which of symbol proxies 421, 422, 423, 424, 425, 426, 427, 428 is asserted and to provide the detected assertion as real output 462. Thus, in this case, at a time 431, symbol proxy 424 is asserted and real output 462 is identified with Proxy(3) in place of the aforementioned symbol pattern; at a time 433, symbol proxy 424 is asserted and real output 462 is identified with Proxy(3) in place of the aforementioned symbol pattern; at a time 435, symbol proxy 428 is asserted and real output 462 is identified with Proxy(7) in place of the aforementioned symbol pattern;

and at a time 437, symbol proxy 422 is asserted and real output 462 is identified with Proxy(1) in place of the aforementioned symbol pattern. This third rate series of symbol proxies may then be processed by Viterbi detector 440 using third rate clock 414.

Figure 5:
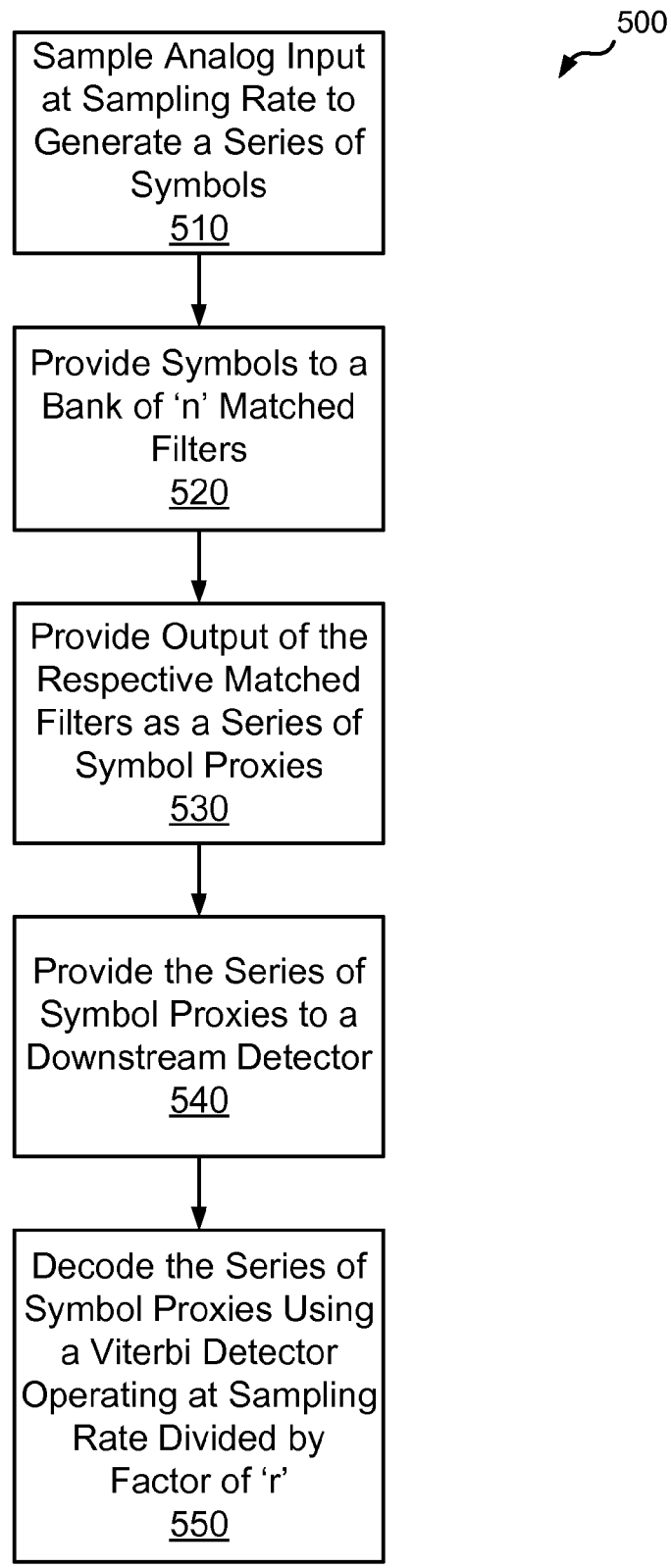
FIG. 5 is a flow diagram showing a method in accordance with some embodiments of the present invention for reducing the effective clock rate of a detector through use of a preceding matched filter set.

Turning to FIG. 5, a flow diagram 500 shows a method in accordance with some embodiments of the present invention for reducing the effective clock rate of a detector through use of a preceding matched filter set. Following flow diagram 500, an analog input is sampled at a sampling rate to generate a series of symbols (block 510). This may include directly sampling an analog input using an analog to digital converter synchronized to a sample clock, or may include sampling an analog input using an analog to digital converter synchronized to a sample clock followed by some level of filtering on the output of the analog to digital converter. The samples of the received analog signal are provided as a number of symbols to a bank of 'n' matched filters (block 520). In some cases, some level of filtering is performed on the samples to remove, for example, inter symbol interference prior to providing the samples as the above mentioned symbols. In other cases, the samples are provided directly the to the matched filters. Each of the matched filters is tuned to detect a particular multi-bit sequence. For example, where four matched filters are used, one filter may be tuned to detect a '00', another to detect a '01, another to detect a '10', and yet another to detect a '11'. Based on the disclosure provided herein, one of ordinary skill in the art will recognize a variety of sequence lengths that may be detected in accordance with different embodiments of the present invention.

The output of each of the matched filters is provided as a series of symbol proxies (block 530). Thus, for example, in the situation above where four matched filters are used, four symbol proxies are provided with one being asserted whenever a '00' sequence is detected, another being asserted whenever a '01' sequence is detected, another being asserted whenever a '10' sequence is detected, and yet another being asserted whenever a '11' sequence is detected. This process is continued as the received symbol is updated at the sampling clock rate. The series of symbol proxies is provided to a downstream detector (block 540). The series of symbol proxies is processed using a downstream detector operating at a clock rate that is the sample clock rate divided by a factor 'r' (block 550). As each of the symbol proxies in the series of symbol proxies represents multiple bits, the rate at which the symbol proxies may be process is reduced in comparison to the sampling clock. For example, where each of the symbol proxies represents two symbols, the factor 'r' is two. Alternatively, where each of the symbol proxies represents three symbols, the factor 'r' is three. Based on the disclosure provided herein, one of ordinary skill in the art will recognize a variety of numbers of bits that may be incorporated into each symbol proxy and a corresponding factor 'r' that may be used for determining the processing rate at which the downstream detector operates.

Various embodiments of the present invention modify the timing loop to utilize the output of a bank of matched filters to generate a reduced latency phase selection. In particular, a bank of auto-convolution filters precedes the detector and makes decisions based on short patterns of a sequence of bits. Since only relatively short patterns are detected using the bank of auto-convolution filters, the number of auto-convolution filters included in the bank of auto-convolution filters remains reasonable. When used in, for example, a hard disk drive device, a preamble pattern is generally provided as part of an analog input that allows for determining the phase and frequency at which data processing is to be performed. During the preamble, the data path is not necessarily needed, and matched filters that otherwise would have been used for data processing can be used for timing phase detection. A typical preamble involves a 4T pattern. In such a case, the matched filters may be tuned or otherwise designed to detect a particular one of two or more different phases of the 4T pattern. Combined, the matched filters each detect the incoming 4T pattern at a different phase and one of the matched filters is selected as the best match. In particular, the one yielding the best match provides the maximum output. By determining the best match, the current phase of the sampling clock may be determined and a better phase may be selected. This selection may be either snapped into implementation, or implemented over time by an incremental adjustment process. Since the matched filters perform equalization and are optimal detectors in the presence of noise, such an approach of using the output of matched filters to adjust sampling phase of an incoming data signal provides a fast and robust approach.

Figure 6:
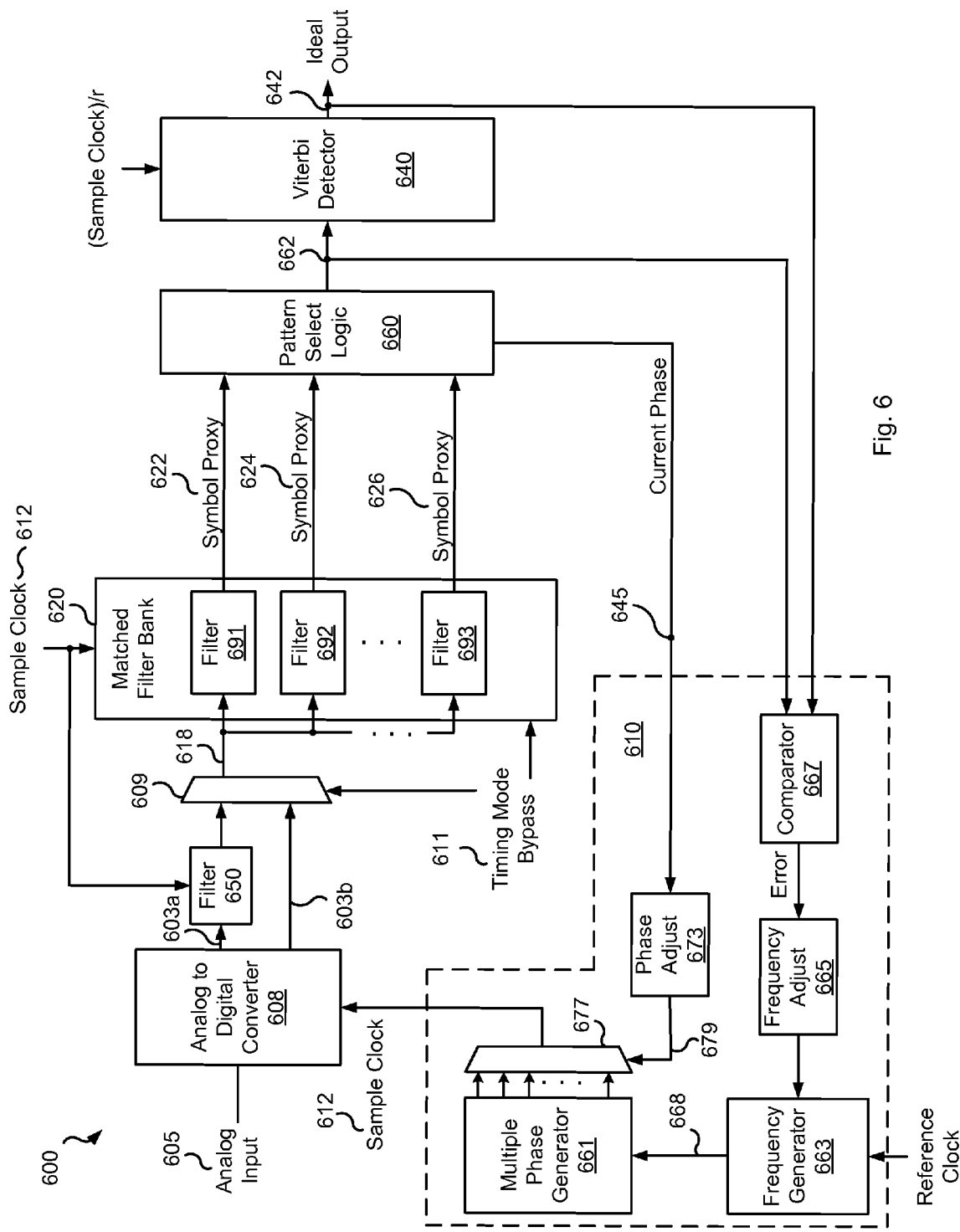
FIG. 6 shows a decoding system including a reduced latency clock phase selection in accordance with various embodiments of the present invention.

FIG. 6 shows a decoding system 600 similar to those discussed above in relation to FIGS. 2-4, except that it includes a timing bypass mode that allows it to adjust the phase of a sampling clock with relatively low latency. In particular, when a timing phase of an information transfer is ongoing, a timing mode bypass signal 611 is asserted, and when a data processing mode is selected, timing mode bypass signal 611 is not asserted. In the data processing mode, decoding system 600 operates similar to that described above in relation to FIG. 2. Decoding system 600 includes a matched filter bank 610 that operates to reduce an incoming set of symbols 618 to symbol proxies 622, 624, 626, and is synchronized to a sample clock 612. Symbol proxies 622, 624, 626 are processed by a Viterbi detector 640 synchronous to a frequency reduced clock 614 (i.e., sample clock 612 divided by a factor 'r'). Decoding system 600 includes an analog to digital converter 608 that converts an analog input 605 into a series of digital samples 603 synchronized to sample clock 612. Respective digital samples 603 are provided on each cycle of sample clock 612 to a filter 650. Filter 650 may be a finite impulse response filter tailored for reducing any noise incorporated into analog input 608.

A multiplexer 609 is selected by timing mode bypass signal 611 such that filter 650 provides a filtered digital output 618 (i.e., symbols) to matched filter bank 610 that includes a number of filters 691, 692, 693 that are each tailored to detecting a different pattern (i.e., defined series) of digital bits. In one particular embodiment of the present invention, filters 691, 692, 693 are implemented as finite impulse response filters tuned to particular bit patterns. For example, filter 691 may be tailored for detecting a '00' series, filter 692 may be tailored for detecting a '01' series, and filter 693 may be tailored for detecting a '11' series. Based on the disclosure provided herein, one of ordinary skill in the art will recognize a variety of patterns that may be recognized by a given filter implementation. Further, a given filter may be designed to detect a pattern of two or more digital bits. Anytime the particular pattern to which a filter is tuned is identified, a respective symbol proxy 622, 624, 626 associated with the particular filter is asserted. Thus, following the above example where filter 611 is tuned for detecting a '00' series, filter 613 is tuned for detecting a '01' series, and filter 615 is tuned for detecting a '11' series, symbol proxy 622 is asserted whenever a '00' pattern is identified, symbol proxy 624 is asserted whenever a '01' pattern is identified, and symbol proxy 626 is asserted whenever a '11' pattern is identified.

A pattern select logic circuit 660 selects which of symbol proxies 622, 624, 626 is passed as a real output 662 to Viterbi detector 640. In some cases, in addition to passing symbol proxies 622, 624, 626 to Viterbi detector 640, a confidence metric (i.e., soft information) is provided to Viterbi detector 640 instead of a single bit value. In some cases, there is no feedback in the matched filters which reduces the possibility of error propagation. After processing, Viterbi detector 640 yields an ideal output 642. Where each of symbol proxies 622, 624, 626 represent a series of two defined bits, then Viterbi detector 640 operates an one half the rate of matched filter bank 610. Said another way, frequency reduced clock 214 is one half the frequency of sample clock 612. Reduction to a half rate frequency uses a matched filter bank with four tuned filters—one for '00', another for '01', another for '10', and yet another for '11'. Alternatively, where each of symbol proxies 622, 624, 626 represent a series of three defined bits, then Viterbi detector 640 operates an one third the rate of matched filter bank 610. Said another way, frequency reduced clock 614 is one third the frequency of sample clock 612. Reduction to a third rate frequency uses a matched filter bank with eight tuned filters—one for '000', another for '001', another for '010', another for '011', another for '100', another for '101', another for '110', and yet another for '111'. It should be noted that the filters may be tuned to detect even longer patterns in which case more filters would be used, with a corresponding decrease in frequency reduced clock 614. Based on the disclosure provided herein, one of ordinary skill in the art will recognize a variety of combinations of matched filter banks and frequency reduced clocks 614 that are possible in accordance with different embodiments of the present invention. Of note, by reducing the frequency at which Viterbi detector 640 operates without reducing the frequency at which analog input 605 is received and processed, a higher bandwidth decoding system is possible using a less complex Viterbi detector 640.

In contrast, when a timing phase of an information transfer is ongoing, timing mode bypass signal 611 is asserted causing digital samples 603 to bypass filter 650 and be provided to matched filter bank 620 by multiplexer 609. Matched filters 691, 692, 693 are each re-tuned to detect a pattern corresponding to two or more different phases of a preamble or other timing signal incorporated into analog input 605. For example, a 4T preamble pattern may be used. In some embodiments of the present invention matched filter bank 620 includes four matched filters with each matched filtered programmably tuned to detect a timing pattern ninety degrees out of phase from the preceding matched filter. For each cycle of sample clock 612, symbol proxies 622, 624, 626 are driven based on the output from the respective matched filters 691, 692, 693 tuned to the particular phases. The matched filter that is the closest match to the phase of sample clock 612 generates a symbol proxy of with the highest value and is selected by pattern select logic 660. Based on a determination of which phase proxy most closely matches the preamble pattern, the current phase of sample clock 612 can be determined. This determination of the current phase of sample clock 612 may then be used as a reference point to any modification of the phase of sample clock 612. For example, where an earlier phase is desired, a phase adjust circuit 673 receives an indication of the current phase 645 and provides a phase selector output 679 selecting an earlier phase via a multiplexer 677. Alternatively, where a later phase is desired, phase adjust circuit 673 receives the indication of the current phase 645 and provides phase selector output 679 selecting a later phase via multiplexer 677. Multiplexer 677 receives a number of phases of a frequency adjusted reference clock 668, and phase selector output 679 is operable to select between the various phases such that multiplexer 677 provides the desired phase of sample clock 612.

A frequency adjustment of sample clock 612 is accomplished similar to how frequency adjustment is done in existing decoding systems. In particular, real output 662 and ideal output 642 are provided to a comparator 667 where they are compared. The output of comparator 667 is an error value 669 that is provided to a frequency adjustment circuit 665. The output of frequency adjustment circuit 665 is provides as a feedback control to a frequency generator circuit 663. Frequency generator circuit 663 generates the desired frequency of sample clock 612 based on a reference clock 663 that is adjusted based on the output of frequency adjustment circuit 665. The output of frequency generator circuit 663 is frequency adjusted reference clock 668 that exhibits the frequency desired for sample clock 612, and is provided to multiphase generator 661.

Figure 7:
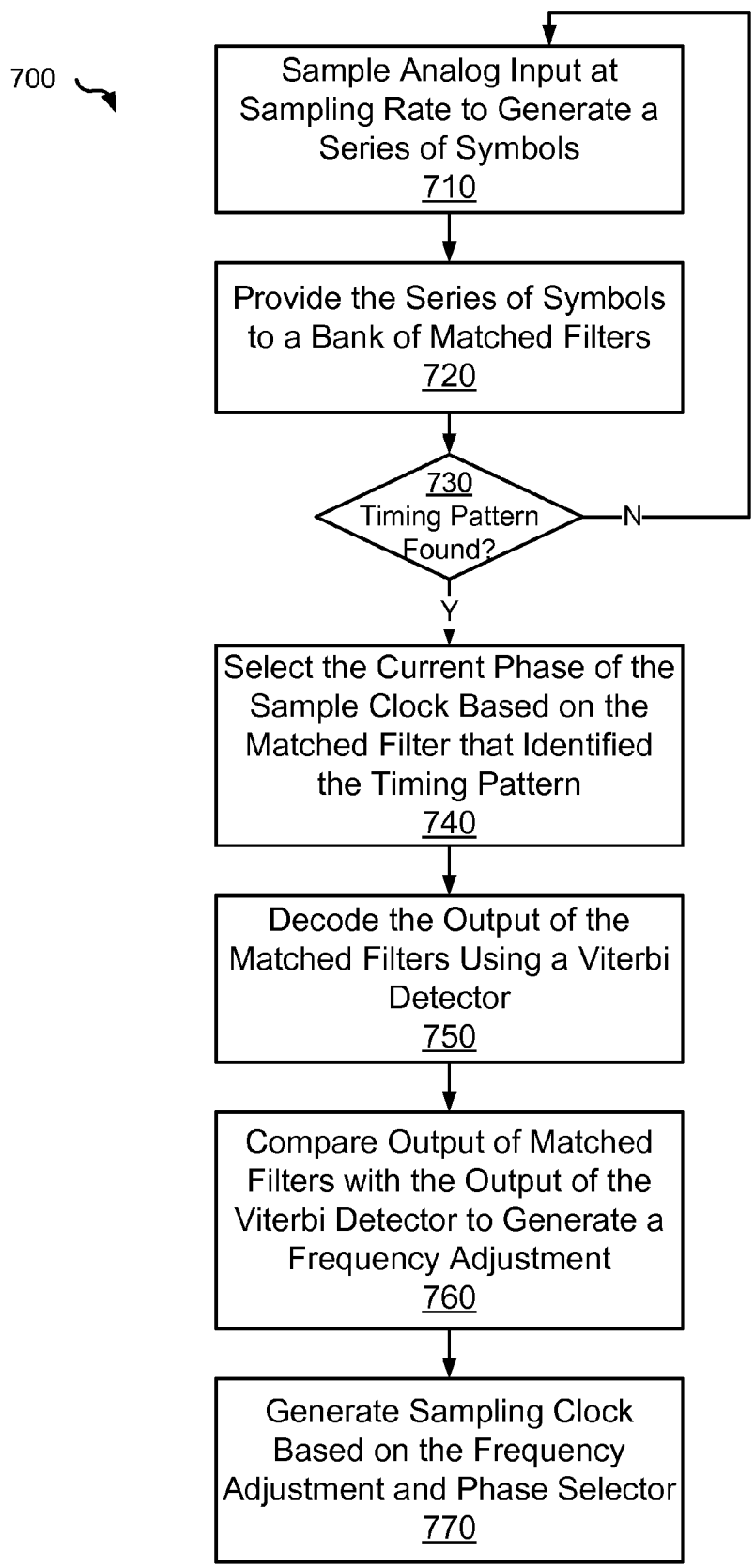
FIG. 7 is a flow diagram showing a method in accordance with some embodiments of the present invention for reduced latency clock selection.

Turning to FIG. 7, a flow diagram 700 shows a method in accordance with some embodiments of the present invention for reduced latency clock selection. Following flow diagram 700, an analog input is sampled as a defined sampling rate to generate a series of symbols corresponding to the analog input (block 710). The series of symbols are provided to a bank of matched filters (block 720). The bank of matched filters includes a number of individual filters that are tuned to detect a particular bit sequence corresponding to different phases of a timing pattern, and to assert whenever the particular bit sequence is identified (block 720). Thus, when a timing pattern is identified, one of the matched filters that is tuned at or near the phase of the sample clock will produce the timing pattern with the maximum likelihood. This results in the generation of a series of proxy symbols. From this, it is determined whether a particular timing pattern has been found based upon the assertion of the output of any of the matched filters (block 730). Where the timing pattern has not been identified (block 730), the process of sampling and filtering continues (blocks 710, 720).

Alternatively, where the timing pattern is identified (block 730), the matched filter that identified the timing pattern is itself identified. The matched filter correlated to the timing pattern will be the filter operating at the phase closest to the current sample clock (block 740). This information may be used to select a phase either earlier or later in time.

In addition, the series of proxy symbols are provided to a detector that performs a detection algorithm on the proxy symbols and yields and ideal output (block 750). The ideal output from the detector is compared with the real output from the matched filters, with the difference being used to generate a frequency adjustment value (block 760). The frequency adjustment value is used to modify the frequency of an output clock to that desired in the sampling clock, and the phase selector is operable to select which phase of the defined frequency clock to provide as the sampling clock (block 770). It should be noted that in some embodiments of the present invention that modification of the selected clock phase and modification of the selected clock frequency are independent. In such a case, the selected phase may be accomplished based on information provided from the matched filters before the same information is processed through the detector. Such an approach allows for reduced latency adjustment of the clock phase followed by continuous updating of both clock phase and frequency as additional information is derived from the analog input.

Figure 8:
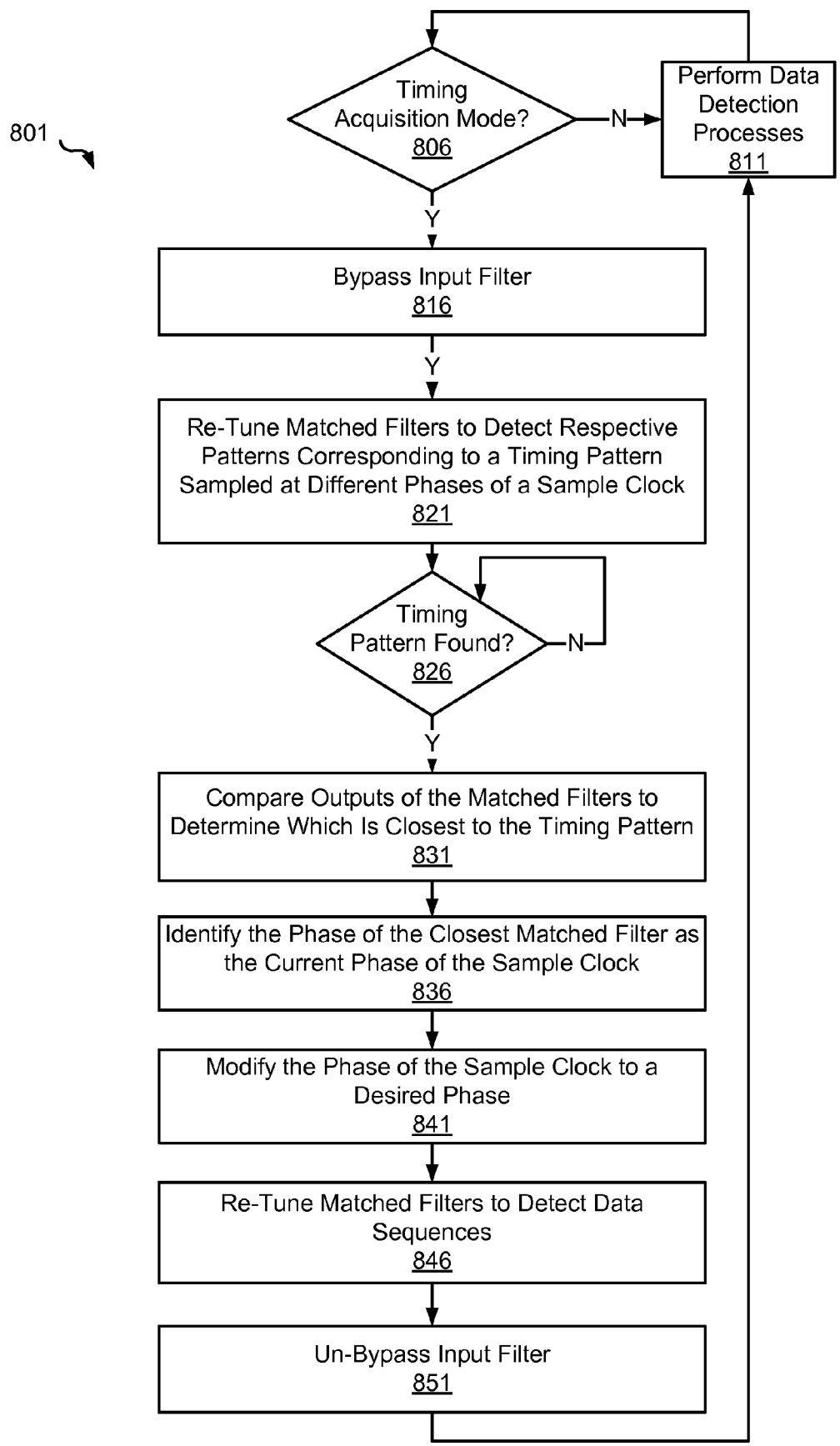
FIG. 8 is a flow diagram showing a method in accordance with some embodiments of the present invention for re-using data decoding circuitry to perform sample clock phase identification.

Turning to FIG. 8, a flow diagram 800 shows a method in accordance with some embodiments of the present invention for re-using data decoding circuitry to perform sample clock phase identification. Following flow diagram 800, it is determined whether a timing acquisition mode is starting (block 806). This may include, for example, determining in a hard disk drive system that a wedge has been entered that includes timing and address information. Base on the disclosure provided herein, one of ordinary skill in the art will recognize other signals that timing information may be available. Where a timing acquisition mode is not called for (block 806), standard data detection processes are performed (block 811). This may include, for example, the processes discussed above in relation to FIGS. 2-5.

Alternatively, where a timing acquisition mode is called for (block 806), an input filter of the decoding system is bypassed (block 816), and two or more of the matched filters are re-tuned to detect respective patterns corresponding to an expected timing pattern (e.g., a 4T preamble pattern or the like) as if it was sampled at different phases of a sample clock (block 821). It is then determined if the timing pattern has been received (block 826). Where the timing pattern has not yet been received (block 826), the process of monitoring for the timing pattern continues.

Alternatively, where the timing pattern has been received (block 826), the outputs from the various matched filters are compared to determine which filter provided an output closest to the timing pattern (i.e., a maximum) (block 831). The phase associated with the matched filter that is closest to the timing pattern is identified as the current phase of the sample clock (block 836). This knowledge of the current phase of the sample clock can be used to modify the sample clock to an earlier or later phase as desired (block 841). With this done, the matched filters are re-tuned for data processing similar to that discussed above in relation to FIGS. 2-4 (block 846) and the input filter is un-bypassed such that data is again filtered before processing by the matched filter bank (block 851). Data detection processes are then resumed (block 811).

Figure 1:
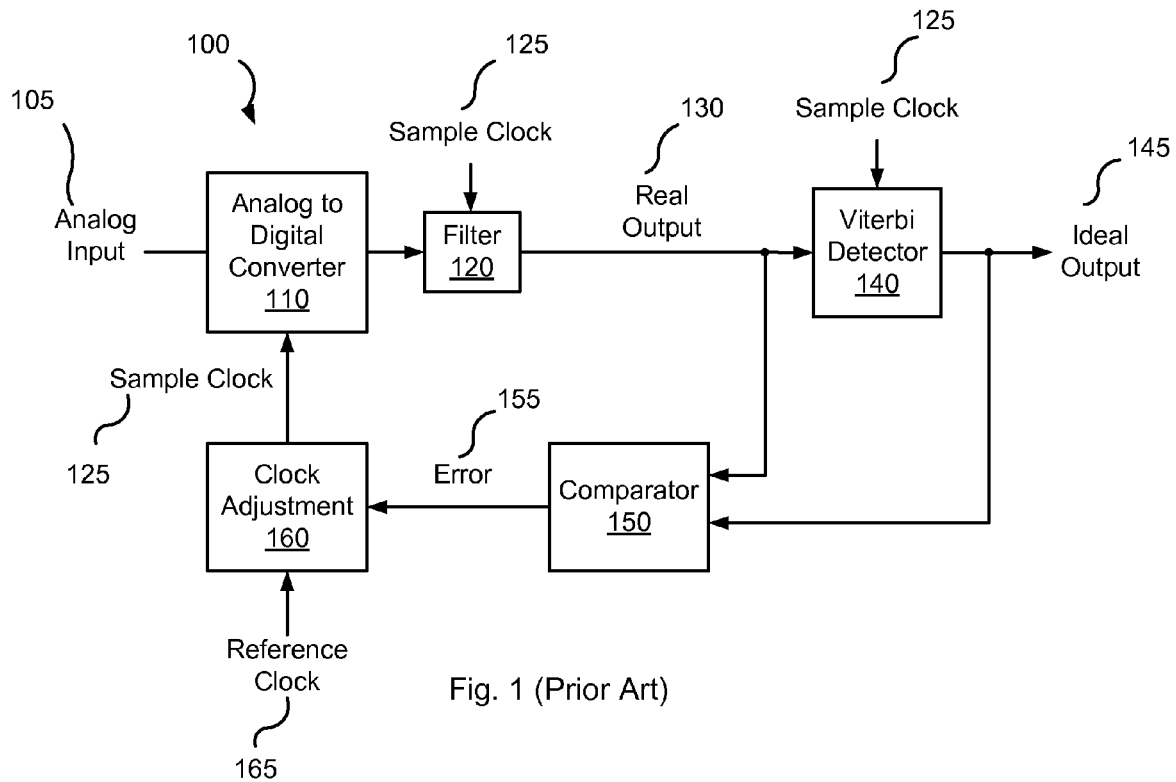
FIG. 1 shows prior art data decoding system.
Figure 9:
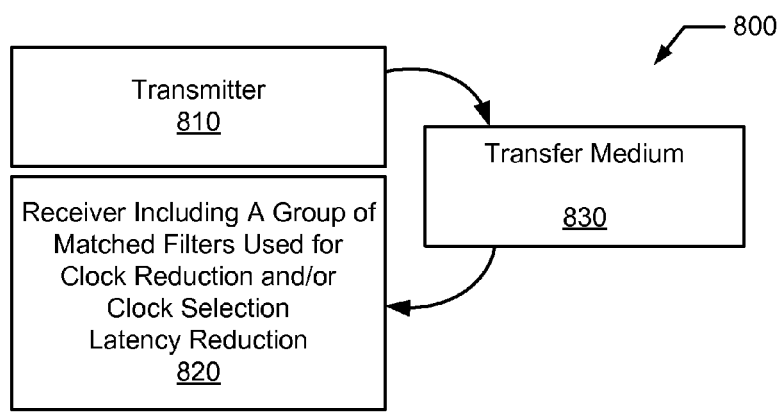
FIG. 9 depicts a communication system including a group of matched filters used for clock reduction and/or clock selection latency reduction in accordance with some embodiments of the present invention.

Turning to FIG. 9, a communication system 800 is depicted that includes a group of matched filters used for clock reduction and/or clock selection latency reduction in accordance with some embodiments of the present invention. It should be noted that the phrase "communication system" is used in its broadest sense to mean any system capable of transferring information. Communication system 800 includes a transmitter 810, a transfer medium 830, and a receiver 820 that includes a group of matched filters that are used to implement clock reduction in a detector and/or clock selection latency reduction in a timing feedback loop. Transmitter 810 may be any circuit capable of receiving information for transmission via transfer medium 830. Thus, for example, where transfer medium is a magnetic storage medium of a hard disk drive, transmitter 810 may be a write head assembly capable of processing information for storage on the magnetic storage medium. In such a case, receiver 820 may be a read head and associated detection circuitry that is capable of processing the received information. Alternatively, where transmitter 810 is a transmitter of a wireless communication device such as a cellular telephone, transfer medium may be an atmosphere capable of transmitting wireless RF signals. In such a case, receiver 820 may be an antenna and associated detection circuitry that is capable of processing the received information. Receiver 820 may include any of the decoder systems discussed above in relation to FIGS. 2-4 and 6. Based on the disclosure provided herein, one of ordinary skill in the art will recognize a variety of communication systems to which receivers in accordance with one or more embodiments of the present invention may be applied.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. For example, while various embodiments of the present invention are described with a particular number of filters and a particular number of pattern lengths, it should be noted that any number of filters and pattern lengths may be employed in accordance with different embodiments of the present invention. Therefore, the above description should not be taken as limiting the scope of the invention, which is defined by the appended claims.

What is claimed is:

1. A reduced clock rate data decoding circuit, the circuit comprising: a matched filter bank, wherein the matched filter bank receives a series of symbols at a rate corresponding to a sample clock, wherein the matched filter bank includes a first matched filter and a second matched filter, wherein the first matched filter is tuned to detect a first bit sequence in the series of symbols and to assert a first symbol proxy upon detection of the first bit sequence, and wherein the second matched filter is tuned to detect a second bit sequence in the series of symbols and to assert a second symbol proxy upon detection of the second bit sequence; and a detector circuit, wherein the detector circuit processes a series of symbol proxies including the first symbol proxy and the second symbol proxy at a rate corresponding to a reduced rate clock, wherein the reduced rate clock is the sample clock divided by a factor.

2. The circuit of claim 1, wherein the first matched filter and the second matched filter are finite impulse response filters.

3. The circuit of claim 1, wherein the matched filter bank further includes a third matched filter tuned to detect a third bit sequence in the series of symbols and to assert a third symbol proxy upon detection of the third bit sequence, and a fourth matched filter tuned to detect a fourth bit sequence in the series of symbols and to assert a fourth symbol proxy upon detection of the fourth bit sequence; and wherein the series of symbol proxies further includes the third symbol proxy and the fourth symbol proxy.

4. The circuit of claim 3, wherein the first bit sequence is '00', the second bit sequence is '01', the third bit sequence is '10' and the fourth bit sequence is '11'; and wherein the factor is two.

5. The circuit of claim 1, wherein the matched filter bank further includes a third matched filter tuned to detect a third bit sequence in the series of symbols and to assert a third symbol proxy upon detection of the third bit sequence, a fourth matched filter tuned to detect a fourth bit sequence in the series of symbols and to assert a fourth symbol proxy upon detection of the fourth bit sequence, a fifth matched filter tuned to detect a fifth bit sequence in the series of symbols and to assert a fifth symbol proxy upon detection of the fifth bit sequence, a sixth matched filter tuned to detect a sixth bit sequence in the series of symbols and to assert a sixth symbol proxy upon detection of the sixth bit sequence, a seventh matched filter tuned to detect a seventh bit sequence in the series of symbols and to assert a seventh symbol proxy upon detection of the seventh bit sequence, and an eighth matched filter tuned to detect an eighth bit sequence in the series of symbols and to assert an eighth symbol proxy upon detection of the eighth bit sequence; and wherein the series of symbol proxies further includes the third symbol proxy, the fourth symbol proxy, the fifth symbol proxy, the sixth symbol proxy, the seventh symbol proxy and the eighth symbol proxy.

6. The circuit of claim 5, wherein the first bit sequence is '000', the second bit sequence is '001', the third bit sequence is '010', the fourth bit sequence is '011', the fifth bit sequence is '100', the sixth bit sequence is '101', the seventh bit sequence is '110' and the eighth bit sequence is '111'; and wherein the factor is three.

7. The circuit of claim 1, wherein the circuit further comprises:
an analog to digital converter, wherein the analog to digital converter is operable to receive an analog input and to provide a series of digital samples of the analog input; and
a filter, wherein the filter is operable to receive the series of digital samples, to filter noise associated with the series of digital samples, and to provide the series of symbols.

8. The circuit of claim 7, wherein the noise includes inter symbol interference.

9. The circuit of claim 1, wherein the detector is a Viterbi algorithm detector.

10. The circuit of claim 1, wherein each of the first symbol proxy and the second symbol proxy include a predicted level and confidence information indicating a degree of confidence in the predicted level.

11. A method for data detection using a reduced rate clock, the method comprising:
receiving a series of symbols at a rate corresponding to an input clock;
filtering the series of symbols in parallel through a first matched filter, a second matched filter, a third matched filter and a fourth matched filter; and wherein the first matched filter is tuned to detect a first bit sequence in the series of symbols and to assert a first symbol proxy upon detection of the first bit sequence, the second matched filter is tuned to detect a second bit sequence in the series of symbols and to assert a second symbol proxy upon detection of the second bit sequence, the third matched filter is tuned to detect a third bit sequence in the series of symbols and to assert a third symbol proxy upon detection of the third bit sequence, and the fourth matched filter is tuned to detect a fourth bit sequence in the series of symbols and to assert a fourth symbol proxy upon detection of the fourth bit sequence; and
performing a data detection on a series of symbol proxies including the first symbol proxy, the second symbol proxy, the third symbol proxy and the fourth symbol proxy at a rate corresponding to the input clock divided by a factor.

12. The method of claim 11, wherein the first bit sequence is '00', the second bit sequence is '01', the third bit sequence is '10' and the fourth bit sequence is '11'; and wherein the factor is two.

13. The method of claim 11, wherein filtering the series of symbols in parallel further includes filtering the series of symbols through a fifth matched filter tuned to detect a fifth bit sequence in the series of symbols and to assert a fifth symbol proxy upon detection of the fifth bit sequence, a sixth matched filter tuned to detect a sixth bit sequence in the series of symbols and to assert a sixth symbol proxy upon detection of the sixth bit sequence, a seventh matched filter tuned to detect a seventh bit sequence in the series of symbols and to assert a seventh symbol proxy upon detection of the seventh bit sequence, and an eighth matched filter tuned to detect an eighth bit sequence in the series of symbols and to assert an eighth symbol proxy upon detection of the eighth bit sequence; and wherein the series of symbol proxies further includes the fifth symbol proxy, the sixth symbol proxy, the seventh symbol proxy, and the eighth symbol proxy.

14. The method of claim 13, wherein the first bit sequence is '000', the second bit sequence is '001', the third bit sequence is '010', the fourth bit sequence is '011', the fifth bit sequence is '100', the sixth bit sequence is '101', the seventh bit sequence is '110' and the eighth bit sequence is '111'; and wherein the factor is three.

15. The method of claim 11, wherein the method further comprises:
receiving an analog signal;
performing an analog to digital conversion on the analog signal to generate a series of digital samples representing the analog signal; and
filtering the series of digital samples to yield the series of symbols.

16. The method of claim 15, wherein the analog to digital conversion is done at a rate corresponding to the input clock.

17. A communication system including a receiver with a reduced rate data detector, the system comprising:
a receiver, wherein the receiver includes:
an analog to digital converter, wherein the analog to digital converter is operable to receive an analog signal and to generate a series of digital samples representing the analog signal at a rate corresponding to an input clock;
a matched filter bank, wherein the matched filter bank is operable to receive a series of symbols derived from the series of digital samples and to filter the received series of symbols through a first matched filter tuned to detect a first bit sequence in the series of symbols and to assert a first symbol proxy upon detection of the first bit sequence, a second matched filter tuned to detect a second bit sequence in the series of symbols and to assert a second symbol proxy upon detection of the second bit sequence, a third matched filter tuned to detect a third bit sequence in the series of symbols and to assert a third symbol proxy upon detection of the third bit sequence, and a fourth matched filter tuned to detect a fourth bit sequence in the series of symbols and to assert a fourth symbol proxy upon detection of the fourth bit sequence; and
a detector, wherein the detector is operable to process a series of symbol proxies including the first symbol proxy, the second symbol proxy, the third symbol proxy and the fourth symbol proxy at a rate corresponding to the input clock divided by a factor.

18. The system of claim 17, wherein the factor is an integer value larger than one.

19. The communication system of claim 17, wherein the analog signal is transmitted by a transmitter to the receiver via a transfer medium, wherein the communication system is a hard disk drive system, and wherein the transfer medium is a magnetic storage medium.

20. The communication system of claim 17, wherein the analog signal is transmitted by a transmitter to the receiver via a transfer medium, wherein the communication system is a wireless communication system, and wherein the transfer medium is an atmosphere through which a radio frequency signal is transmitted.

* * * * *